United States Patent Office 3,340,948
Patented Sept. 12, 1967

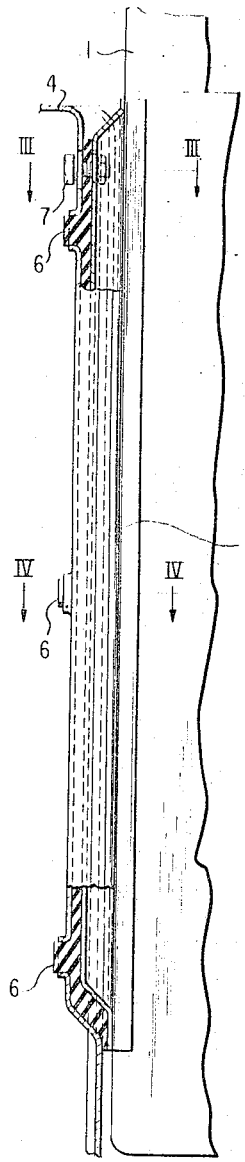
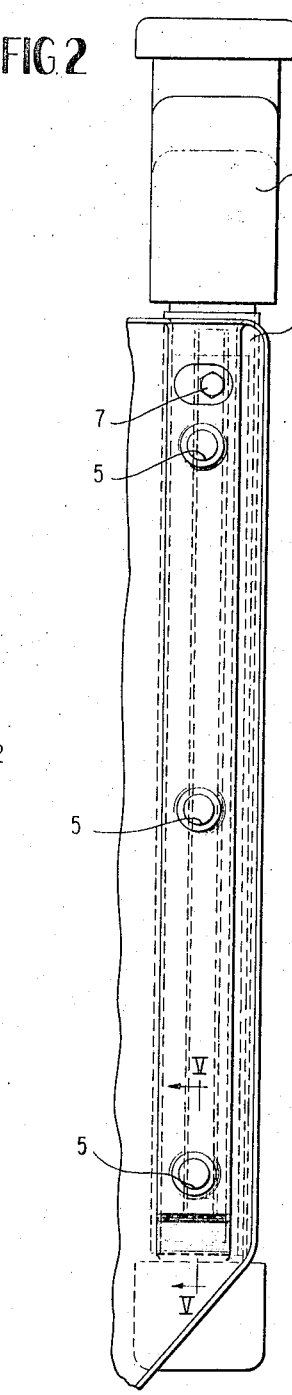
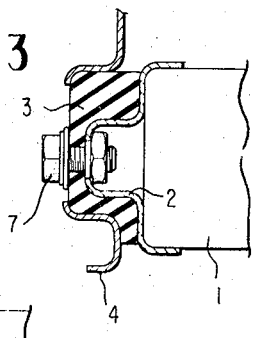
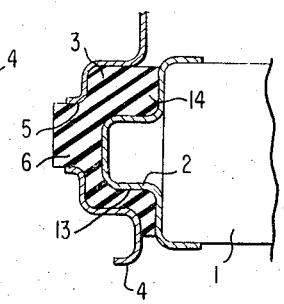
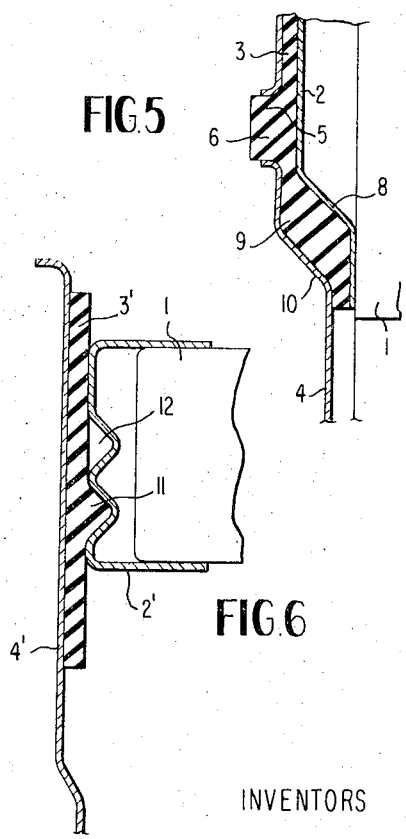

3,340,948
RADIATOR MOUNT
Franz Deckert, Sindelfingen, and Kurt Kiehnle, Esslingen (Neckar), Germany, assignors to Daimler-Benz Aktiengesellschaft, Stuttgart-Unterturkheim, Germany
Filed Nov. 16, 1964, Ser. No. 411,541
Claims priority, application Germany, Nov. 14, 1963, D 42,940
19 Claims. (Cl. 180—68)

The present invention relates to an elastic fastening and securing of a radiator in motor vehicles.

A three-point support for the radiator of a motor vehicle is known in the prior art. Such three-point support systems typically employ vertically oriented channel members which are formed in a part of the vehicle which is attached to the frame by means of profile or sectional rubber blocks. In addition, these systems require that the radiator be secured at the bottom in a rubber bearing which supports the load elastically and rigidly connects the radiator with the chassis or frame by means of clamping bolts. This known three-point radiator support system has a disadvantage in that the radiator must either be located above a cross bearer of the forward frame or else additional bearer arms must be provided at the cross bearer for the accommodation of the rubber bearing support for the radiator. This entails a considerable increase in cost for the support of the radiator, not to mention the fact that the additional bearer arms also impair the ground clearance of the vehicle.

The present invention aims at eliminating the aforementioned disadvantages and at improving the elastic fastening and bearing support of the radiator in motor vehicles. The present invention solves the underlying problems in that the radiator is guided substantially over the entire length of the side surfaces thereof in and transversely to the driving direction by means of elastic rails and is connected by means of these rails with a fixed vehicle part. In this way, the radiator is not only constrained in a substantially vertical orientation, but also, the weight of the radiator is supported in a horizontal plane by means of the elastic rails.

Additional support means for the vertical accommodation of the radiator at the vehicle frame are obviated by the arrangement and construction of the elastic rails in accordance with the present invention so that the fastening and mounting of the radiator is far-reachingly independent of the construction of the vehicle frame. The elastic rails absorb shocks of the vehicle and dampen advantageously any vibrations that may occur.

A particularly advantageous radiator fastening and mounting is achieved in that the elastic rails extend over the entire length of the radiator lateral surfaces so that separate air-guide sheet covers for the radiator become superfluous.

According to the further development of the present invention, the radiator is provided with lateral guide means and the elastic rails are received by the mounting support means which are rigidly connected with a fixed vehicle part, whereby in the assembled condition the radiator is inserted with its guide means into the elastic rails and is connected therewith by means of screws, bolts, rivets or the like.

According to one embodiment of the present invention, the mounting support means are provided advantageously on each guided side of the radiator with an extension which is constructed as support bearing for the radiator whereby bulge- or bead-like extensions of the elastic rails are matched in the geometric configuration of the cross section thereof to support bearings of the mounting support means, and the lateral guide means of the radiator are provided each with an abutment surface for the support bearings. According to a still further advantageous construction of the present invention, the mounting supports including the lateral guide means of the radiator are provided at the end thereof facing the vehicle floor with a smaller spacing or clearance than at the opposite end. The radiator thus possesses a wedge-shaped mounting support and guide means so that separate support bearings for the vertical accommodation thereof are no longer required, thereby resulting in an advantageous decrease in the cost of the elastic support means.

Further features of the present invention relate to the advantageous securing and fastening of the elastic rails, according to which the mounting supports are provided with at least one bore each and the elastic rails are provided each with at least one pin-shaped projection, whereby in the assembled condition the pin-shaped projections engage without play in the bores, whereas with another embodiment of the present invention the elastic rails are connected with the mounting supports by cementing, riveting, gluing, bonding or the like.

An advantageous elastic guidance of the radiator is achieved by the present invention in that the elastic rails are constructed of rectangular shape in cross section and are provided on the surfaces thereof facing the radiator with at least one prismatic-like guide means extending in the longitudinal direction of the rail, whereby the radiator is also provided on each lateral surface thereof with at least one prismatic-like guide means. By the use of several prismatic-like guidances at the radiator and/or at the elastic rails any possible manufacturing tolerances and variations may be advantageously compensated for during installation of the radiator in that the installed position of the radiator can be changed in the longitudinal direction of the vehicle. In still another embodiment of the elastic rails in accordance with the present invention, the rails are constructed of U-shaped cross section, wherein the web portions of each U-shaped rail may have a different width. By mutual interchange of U-shaped elastic rails, the installed position of the radiator may thereby be varied.

Accordingly, it is an object of the present invention to provide a radiator mounting support in motor vehicles which obviates, by extremely simple means, the aforementioned shortcomings and drawbacks encountered with the prior art constructions.

Another object of the present invention resides in the provision of a radiator mounting and securing support which permits complete freedom in the choice of the location of the installed radiator, independently of the particular construction of the frame of the vehicle.

Still another object of the present invention resides in the provision of a radiator mounting and supporting arrangement which eliminates impairment of the ground clearance of the vehicle.

Still a further object of the present invention resides in the provision of a radiator mounting support in motor vehicles which not only reduces the cost in manufacture and assembly but which also eliminates the need for additional fastening and supporting means, especially in the form of separate support arms or brackets.

Another object of the present invention resides in the provision of a radiator mounting support for motor vehicles which greatly simplifies the construction and reduces the cost of manufacture thereof by elimination of separate air-guide sheet covering means.

A further object of the present invention resides in the provision of an elastic radiator mount for motor vehicles effectively absorbing vehicle shocks and vibrations in which separate support bearings for the vertical accommodation of the radiator are obviated.

Still a further object of the present invention resides in the provision of a radiator mounting means which produces an elastic guidance of the radiator on a fixed vehicle part together with a reduction in the necessary manufacturing tolerances.

A still further object of the present invention resides in the provision of a radiator mounting support in which manufacturing inaccuracies may be readily compensated for during assembly and installation of the radiator.

These and further objects, features and advantages of the present invention will become more obvious from the following description when taken in connection with the accompanying drawing which shows, for purposes of illustration only, two embodiments in accordance with the present invention, and wherein FIGURE 1 is a partial end elevational view, partly in cross section, of an elastic radiator mounting support according to the present invention.

FIGURE 2 is a side elevational view of the radiator mounting support of FIGURE 1.

FIGURES 3 and 4 are partial cross sectional views, on an enlarged scale, taken along line III—III and IV—IV, respectively, of FIGURE 1.

FIGURE 5 is a partial cross sectional view, on an enlarged scale, taken along line V—V of FIGURE 2, and FIGURE 6 is a partial cross sectional view, similar to FIGURE 4, of a modified embodiment in accordance with the present invention.

Referring now to the drawing wherein like reference numerals are used throughout the various views to designate like parts, reference numeral 1 designates in all the figures a radiator housing of conventional construction. Lateral guide means 2 are provided at the radiator housing 1 by means of which the radiator 1 is guided within elastic rails 3. The elastic rails of essentially U-shape in cross section are received in mounting supports 4 rigidly connected with the vehicle frame or vehicle superstructure. Bores 5 are provided in the mounting supports 4 for the fastening and securing of the elastic rails 3 at the mounting supports 4; pin-shaped securing projections 6 provided at the elastic rails 3 engage in the bores 5 without play for purposes of securing the rails 3 and therewith the radiator 1 at the radiator mounting supports 4. The elastic rails 3 are rigidly connected with the radiator housing 1 by means of screws or bolts 7 engaging in appropriate apertures of the guide means 2.

The lateral guide means 2 of the radiator housing 1 are provided at the ends thereof facing the vehicle floor (not shown) with inclined abutment surfaces 8 (FIG. 5) by means of which the radiator 1 is supported by way of bulge-like or bead-like extensions 9 of the elastic rails 3 on extensions 10 of the mounting supports 4.

In a further modified embodiment of the present invention, illustrated in FIGURE 6, the elastic rails 3′ have a substantially rectangular cross section and are provided with at least one prismatic-like guide means 11. The elastic rails 3′ are connected with the mounting supports 4′ in any appropriate conventional manner (not shown). The lateral guide means 2′ of the radiator housing 1 are provided with wedge-shaped guide grooves 12 which correspond to the prismatic-like guide means 11 of the elastic rails 3′. For purposes of adjusting the radiator in the longitudinal direction of the vehicle, several guide grooves 12 may be provided in the lateral guide means 2′ of the radiator housing 1 (according to FIGURE 6). A similar adjustment may be accomplished by interchanging the two U-shaped elastic rails 3 (according to FIGURE 4) whose leg portions 13 and 14 have different widths.

While we have shown and described two embodiments in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are encompassed by the scope of the appended claims.

We claim:

1. An elastic securing arrangement of a radiator in motor vehicles having a relatively fixed vehicle part, comprising:
    radiator means having lateral surfaces,
    elastic rail means,
    means for guiding said radiator means substantially over the entire length of the lateral surfaces thereof within said elastic rail means substantially in and transversely to the driving direction,
    and further means operatively connecting said lateral surfaces of said radiator means with said fixed vehicle part by way of said elastic rail means to thereby support the weight of said radiator means.

2. An arrangement according to claim 1, wherein said elastic rail means are bonded to said further means.

3. An arrangement according to claim 1, wherein said elastic rail means are riveted to said further means.

4. An elastic mounting arrangement of a radiator in motor vehicles having a relatively fixed vehicle part, comprising:
    radiator means having lateral surfaces,
    elastic rail means,
    means for guiding said radiator means substantially over the entire length of the lateral surfaces thereof within said elastic rail means substantially in and transversely to the driving direction,
    and further means operatively connecting said lateral surfaces of said radiator means with said fixed vehicle part by way of said elastic rail means to thereby support the weight of said radiator means,
    said guide means including lateral guide elements at the radiator means,
    and said further means including mounting support means for receiving said elastic rail means and rigidly connected with said fixed vehicle part,
    the radiator means being inserted in the assembled condition with the guide elements thereof in the elastic rail means and being rigidly connected with the guide elements to said elastic rail means.

5. An elastic securing arrangement of a radiator in motor vehicles having a relatively fixed part, comprising:
    radiator means having lateral surfaces,
    elastic rail means,
    means for guiding said radiator means substantially over the entire length of the lateral surfaces thereof within said elastic rail means substantially in and transversely to the driving direction,
    and further means operatively connecting said lateral surfaces of said radiator means with said fixed vehicle part by way of said elastic rail means to thereby support the weight of said radiator means,
    said further means being provided on each side of the radiator means with an extension constructed as abutment support, and said elastic rail means being provided with bead-like extensions matched in geometric configuration of the cross section thereof to the abutment supports and said guide means being provided each with abutment surfaces for the abutment supports.

6. An elastic securing arrangement of a radiator in motor vehicles having a relatively fixed vehicle part, comprising:
    radiator means having lateral surfaces,
    elastic rail means,
    means for guding said radiator means substantially over the entire length of the lateral surfaces thereof within said elastic rail means substantially in and transversely to the driving direction,
    and further means operatively connecting said lateral surfaces of said radiator means with said fixed vehicle part by way of said elastic rail means to thereby support the weight of said radiator means, the mounting means inclusive the lateral guide means effectively providing a smaller spacing on the side of the radiator means facing the vehicle floor than at the opposite end of the radiator means.

7. An elastic securing arrangement of a radiator in motor vehicles having a relatively fixed vehicle part, comprising:
radiator means having lateral surfaces,
elastic rail means,
means for guiding said radiator means substantially over the entire length of the lateral surfaces thereof within said elastic rail means substantially in and transversely to the driving direction,
and further means operatively connecting said lateral surfaces of said radiator means with said fixed vehicle part by way of said elastic rail means to thereby support the weight of said radiator means,
the mounting means being provided with at least one bore and the elastic rail means with at least one pin-shaped projection, the pin-shaped projection engaging into the bore without play in the installed position of the radiator means.

8. An elastic mounting arrangement of a radiator in motor vehicles having a relatively fixed vehicle part, comprising:
radiator means having lateral surfaces,
elastic rail means,
means for guiding said radiator means substantially over the entire length of the lateral surfaces thereof within said elastic rail means substantially in and transversely to the driving direction,
and further means operatively connecting said lateral surfaces of said radiator means with said fixed vehicle part by way of said elastic rail means to thereby support the weight of said radiator means,
said elastic rail means being of substantially rectangularly shaped cross section and being provided with at least one prismatic-like guide means extending in longitudinal direction of the rail means on the surface thereof facing the radiator means.

9. An elastic mounting arrangement of a radiator in motor vehicles having a relatively fixed vehicle part, comprising:
radiator means having lateral surfaces,
elastic rail means,
means for guiding said radiator means substantially over the entire length of the lateral surfaces thereof within said elastic rail means substantially in and transversely to the driving direction,
and further means operatively connecting said lateral surfaces of said radiator means with said fixed vehicle part by way of said elastic rail means to thereby support the weight of said radiator means,
said elastic rail means being of substantially rectangularly shaped cross section and being provided with at least one prismatic-like guide means extending in the longitudinal direction of the rail means on the surface thereof facing the radiator means,
and the radiator means being provided with complementary prismatic-like guide means on each lateral surface thereof.

10. An elastic mounting arrangement of a radiator in motor vehicles having a relatively fixed vehicle part, comprising:
radiator means having lateral surfaces,
elastic rail means,
means for guiding said radiator means substantially over the entire length of the lateral surfaces thereof within said elastic rail means substantially in and transversely to the driving direction,
and further means operatively connecting said lateral surfaces of said radiator means with said fixed vehicle part by way of said elastic rail means to thereby support the weight of said radiator means,
said elastic rail means being of essentially U-shaped cross section.

11. An elastic mounting arrangement of a radiator in motor vehicles having a relatively fixed vehicle part, comprising:
radiator means having lateral surfaces,
elastic rail means,
means for guiding said radiator means substantially over the entire length of the lateral surfaces thereof within said elastic rail means substantially in and transversely to the driving direction,
and further means operatively connecting said lateral surfaces of said radiator means with said fixed vehicle part by way of said elastic rail means to thereby support the weight of said radiator means,
said elastic rail means being of essentially U-shaped cross section, and the leg portions of each U-shaped elastic rail means having a different width.

12. An elastic mounting arrangement for mounting a radiator in motor vehicles having a relatively fixed vehicle part, comprising:
radiator means having lateral surfaces,
elastic rail means for guidingly receiving therein said lateral surfaces,
and means operatively connecting said lateral surfaces of said radiator means with said fixed vehicle part exclusively by said elastic rail means to thereby support the weight of said radiator means.

13. An elastic securing arrangement of a radiator in motor vehicles having a relatively fixed vehicle part, comprising:
radiator means having lateral surfaces,
elastic rail means,
means for guiding said radiator means substantially over the entire length of the lateral surfaces thereof within said elastic rail means substantially in and transversely to the driving direction,
and further means operatively connecting said lateral surfaces of said radiator means with said fixed vehicle part by way of said elastic rail means,
said further means being provided on each side of the radiator means with an extension constructed at abutment support, said elastic rail means being provided with bead-like extensions matched in the geometric configuration of the cross section thereof to the abutment supports and said guide means being provided each with abutment surfaces for the abutment supports,
the mounting means inclusive the lateral guide means effectively providing a smaller spacing on the side of the radiator means facing the vehicle floor than at the opposite end of the radiator means.

14. An elastic mounting arrangement of a radiator in motor vehicles having a relatively fixed vehicle part, comprising:
radiator means having lateral surfaces,
elastic rail means,
means for guiding said radiator means substantially over the entire length of the lateral surfaces thereof within said elastic rail means substantially in and transversely to the driving direction,
and further means operatively connecting said lateral surfaces of said radiator means with said fixed vehicle part by way of said elastic rail means,
said guide means including lateral guide elements at the radiator means,
and said further means including mounting support means for receiving said elastic rail means and rigidly connected with said fixed vehicle part,
the radiator means being inserted in the assembled condition with the guide elements thereof in the elastic rail means and being rigidly connected with the guide elements to said elastic rail means,
the mounting support means being provided on each side of the radiator means with an extension constructed as abutment support for the radiator means,
said elastic rail means being provided with bead-like extensions matched in the geometric configuration of the cross section thereof to said abutment supports, and the lateral guide elements being provided each with abutment surface means for the abutment supports.

15. An elastic mounting arrangement of a radiator in motor vehicles having a relatively fixed vehicle part, comprising:
radiator means having lateral surfaces,
elastic rail means,
means for guiding said radiator means substantially over the entire length of the lateral surfaces thereof within said elastic rail means substantially in and transversely to the driving direction,
and further means operatively connecting said lateral surfaces of said radiator means with said fixed vehicle part by way of said elastic rail means,
said guide means including lateral guide elements at the radiator means,
and said further means including mounting support means for receiving said elastic rail means and rigidly connected with said fixed vehicle part,
the radiator means being inserted in the assembled condition with the guide elements thereof in the elastic rail means and being rigidly connected with the guide elements to said elastic rail means,
the mounting support means being provided on each side of the radiator means with an extension constructed as abutment support for the radiator means,
said elastic rail means being provided with bead-like extensions matched in the geometric configuration of the cross section thereof to said abutment supports, and the lateral guide elements being provided each with abutment surface means for the abutment supports,
the mounting support means including the lateral guide elements of the radiator means having a smaller spacing on the side of the radiator facing the vehicle floor than at the opposite end of the radiator means.

16. An elastic mounting arrangement of a radiator in motor vehicles having a relatively fixed vehicle part, comprising:
radiator means having lateral surfaces,
elastic rail means,
means for guiding said radiator means substantially over the entire length of the lateral surfaces thereof within said elastic rail means substantially in and transversely to the driving direction,
and further means operatively connecting said lateral surfaces of said radiator means with said fixed vehicle part by way of said elastic rail means,
said guide means including lateral guide elements at the radiator means,
and said further means including mounting support means for receiving said elastic rail means and rigidly connected with said fixed vehicle part,
the radiator means being inserted in the assembled condition with the guide elements thereof in the elastic rail means and being rigidly connected with the guide elements to said elastic rail means,
the mounting support means being provided on each side of the radiator means with an extension constructed as abutment support for the radiator means,
said elastic rail means being provided with bead-like extensions matched in the geometric configuration of the cross section thereof to said abutment supports, and the lateral guide elements being provided each with abutment surface means for the abutment supports,
the mounting support means including the lateral guide elements of the radiator means having a smaller spacing on the side of the radiator facing the vehicle floor than at the opposite end of the radiator means,
the mounting support means being provided with at least one bore each and the elastic rail means with at least one pin-shaped projection, the pin-shaped projection engaging into the bore without play in the installed position of the radiator means.

17. An elastic mounting arrangement of a radiator in motor vehicles having a relatively fixed vehicle part, comprising:
radiator means having lateral surfaces,
elastic rail means,
means for guiding said radiator means substantially over the entire length of the lateral surfaces thereof within said elastic rail means substantially in and transversely to the driving direction,
and further means operatively connecting said lateral surfaces of said radiator means with said fixed vehicle part by way of said elastic rail means,
said guide means including lateral guide elements at the radiator means,
and said further means including mounting support means for receiving said elastic rail means and rigidly connected with said fixed vehicle part,
the radiator means being inserted in the assembled condition with the guide elements thereof in the elastic rail means and being rigidly connected with the guide elements to said elastic rail means,
the mounting support means being provided on each side of the radiator means with an extension constructed as abutment support for the radiator means,
said elastic rail means being provided with bead-like extensions matched in the geometric configuration of the cross section thereof to said abutment surface means for the abutment supports,
the mounting support means including the lateral guide elements of the radiator means having a smaller spacing on the side of the radiator facing the vehicle floor than at the opposite end of the radiator means,
and means for adjusting said radiator means in the installed position thereof in the longitudinal direction of the vehicle.

18. An elastic mounting arrangement according to claim 17, wherein said adjusting means includes elastic rail means of substantially rectangularly shaped cross section provided with at least one prismatic-like guide means extending in the longitudinal direction of the rail means on the surface thereof facing the radiator means, and the radiator means is also provided with complementary prismatic-like guide means on each lateral surface thereof.

19. An elastic mounting arrangement according to claim 17, wherein said adjusting means includes elastic rail means of essentially U-shaped cross section, the leg portions of each U-shaped elastic rail means having a different width.

References Cited

UNITED STATES PATENTS

| | | | |
|---|---|---|---|
| 1,087,519 | 2/1914 | White | 180—68 |
| 1,282,451 | 10/1918 | Moore | 180—68 |
| 1,834,709 | 12/1931 | Ihde | 180—68 |
| 2,755,874 | 7/1956 | Adloff | 180—68 |
| 3,121,467 | 2/1964 | Bryant | 180—68 |
| 3,123,170 | 3/1964 | Bryant | 180—68 |

BENJAMIN HERSH, *Primary Examiner.*

MILTON L. SMITH, *Examiner.*